(12) United States Patent
Fox et al.

(10) Patent No.: US 10,837,720 B2
(45) Date of Patent: Nov. 17, 2020

(54) HEAT EXCHANGER WITH ALUMINUM TUBES ROLLED INTO AN ALUMINUM TUBE SUPPORT

(71) Applicant: TRANE INTERNATIONAL INC., Piscataway, NJ (US)

(72) Inventors: William Burgess Fox, Onalaska, WI (US); Jacob Levi Gregg, Pueblo West, CO (US); Corey Michael Gilbertson, West Salem, WI (US); Sean Andrews Smith, La Crosse, WI (US); Jeffery Carl Gill, Pueblo, CO (US); Robert John Larrinaga, Pueblo West, CO (US)

(73) Assignee: TRANE INTERNATIONAL INC., Davidson, NC (US)

( * ) Notice: Subject to any disclaimer, the term of this patent is extended or adjusted under 35 U.S.C. 154(b) by 544 days.

(21) Appl. No.: 14/533,575

(22) Filed: Nov. 5, 2014

(65) Prior Publication Data

US 2015/0122455 A1  May 7, 2015

Related U.S. Application Data

(60) Provisional application No. 61/900,686, filed on Nov. 6, 2013.

(51) Int. Cl.
*F28F 21/08* (2006.01)
*F28F 9/16* (2006.01)
(Continued)

(52) U.S. Cl.
CPC ............ *F28F 21/084* (2013.01); *F25B 39/00* (2013.01); *F28B 1/06* (2013.01); *F28D 1/05333* (2013.01);
(Continued)

(58) Field of Classification Search
CPC .. F28F 9/013; F28F 9/0131; F28F 9/02; F28F 9/0202; F28F 9/0204; F28F 9/0224; F28F 9/0226; F28F 9/16; F28F 9/162; F28F 9/18; F28F 21/084; F28F 2275/04; F28F 9/0251; F28F 9/0253; F28F 9/0256; F28F 9/0209; F28F 9/0214; F28F 9/0229;
(Continued)

(56) References Cited

U.S. PATENT DOCUMENTS 1,703,527 A   2/1929  Henshall
1,710,579 A   4/1929  Henshall
(Continued)

*Primary Examiner* — Eric S Ruppert
*Assistant Examiner* — Hans R Weiland
(74) *Attorney, Agent, or Firm* — Hamre, Schumann, Mueller & Larson, P.C.

(57) ABSTRACT

Heat exchangers and methods for assembling a heat exchanger are described, such as for example a round tube heat exchanger, which may be a fin and tube heat exchanger, and which may be used for example in a heating, ventilation, and air conditioning system (HVAC) system and/or unit thereof. The heat exchanger includes aluminum tubes mechanically rolled into an aluminum tube support and the tubes are fluidically sealed with the tube support. The aluminum tube support including the aluminum tubes rolled therein is assembled to a fluid manifold configured to allow fluid flow through the heat exchanger and into and/or out of the heat exchanger.

20 Claims, 8 Drawing Sheets

(51) Int. Cl.
*F28F 9/26* (2006.01)
*F28D 1/053* (2006.01)
*F28F 9/02* (2006.01)
*F28F 9/18* (2006.01)
*F28B 1/06* (2006.01)
*F25B 39/00* (2006.01)

(52) U.S. Cl.
CPC .......... *F28F 9/0204* (2013.01); *F28F 9/0224* (2013.01); *F28F 9/16* (2013.01); *F28F 9/162* (2013.01); *F28F 9/18* (2013.01); *F28F 9/262* (2013.01)

(58) Field of Classification Search
CPC ..... F28D 1/05333; B21D 53/08; F25B 39/00; F25B 39/02; F25B 39/028; F25B 39/04; F25D 1/0417; F25D 1/05325; F25D 1/05333; F25D 1/05341
See application file for complete search history.

(56) References Cited

U.S. PATENT DOCUMENTS

| | | | | |
|---|---|---|---|---|
| 1,734,956 A | | 11/1929 | Baldwin | |
| 1,958,226 A | * | 5/1934 | Askin | F25B 39/04 165/149 |
| 2,004,390 A | * | 6/1935 | Benzinger | F28F 9/0202 165/110 |
| 2,627,241 A | | 2/1953 | Przyborowski | |
| 2,735,698 A | * | 2/1956 | Brinen | F28F 9/167 165/173 |
| 3,457,620 A | | 7/1969 | Ares | |
| 3,566,502 A | | 3/1971 | Pasqualini | |
| 3,608,173 A | * | 9/1971 | Watson | B21D 39/06 228/125 |
| 3,787,945 A | * | 1/1974 | Pasek | B21D 39/06 165/175 |
| 3,857,151 A | * | 12/1974 | Young | F28F 9/16 29/523 |
| 4,050,881 A | | 9/1977 | Watson, Jr. | |
| 4,316,503 A | * | 2/1982 | Kurachi | F28D 1/05333 165/175 |
| 4,351,390 A | | 9/1982 | Argyle et al. | |
| 4,482,415 A | * | 11/1984 | Mort | F28F 9/162 156/294 |
| 4,498,220 A | * | 2/1985 | Fiegen | F28F 9/16 29/421.1 |
| 4,531,577 A | | 7/1985 | Humpolik et al. | |
| 4,600,051 A | | 7/1986 | Wehrman | |
| 4,682,650 A | | 7/1987 | Potier | |
| 5,076,353 A | * | 12/1991 | Haussmann | F28D 1/0417 165/110 |
| 5,144,812 A | * | 9/1992 | Mills, Jr. | F25B 13/00 62/186 |
| 5,381,858 A | | 1/1995 | Fredrich | |
| 5,573,061 A | * | 11/1996 | Chiba | F28F 9/0202 165/174 |
| 5,660,050 A | * | 8/1997 | Wilson | F25B 39/04 165/110 |
| 6,892,804 B2 | | 5/2005 | Nozaki et al. | |
| 2002/0023734 A1 | * | 2/2002 | Wagner | F28F 9/0226 165/81 |
| 2004/0040698 A1 | * | 3/2004 | Korth | F28F 1/025 165/173 |
| 2011/0226453 A1 | * | 9/2011 | Pierce | F28D 1/05333 165/173 |
| 2011/0253352 A1 | * | 10/2011 | Suzuki | F28F 9/02 165/173 |

\* cited by examiner

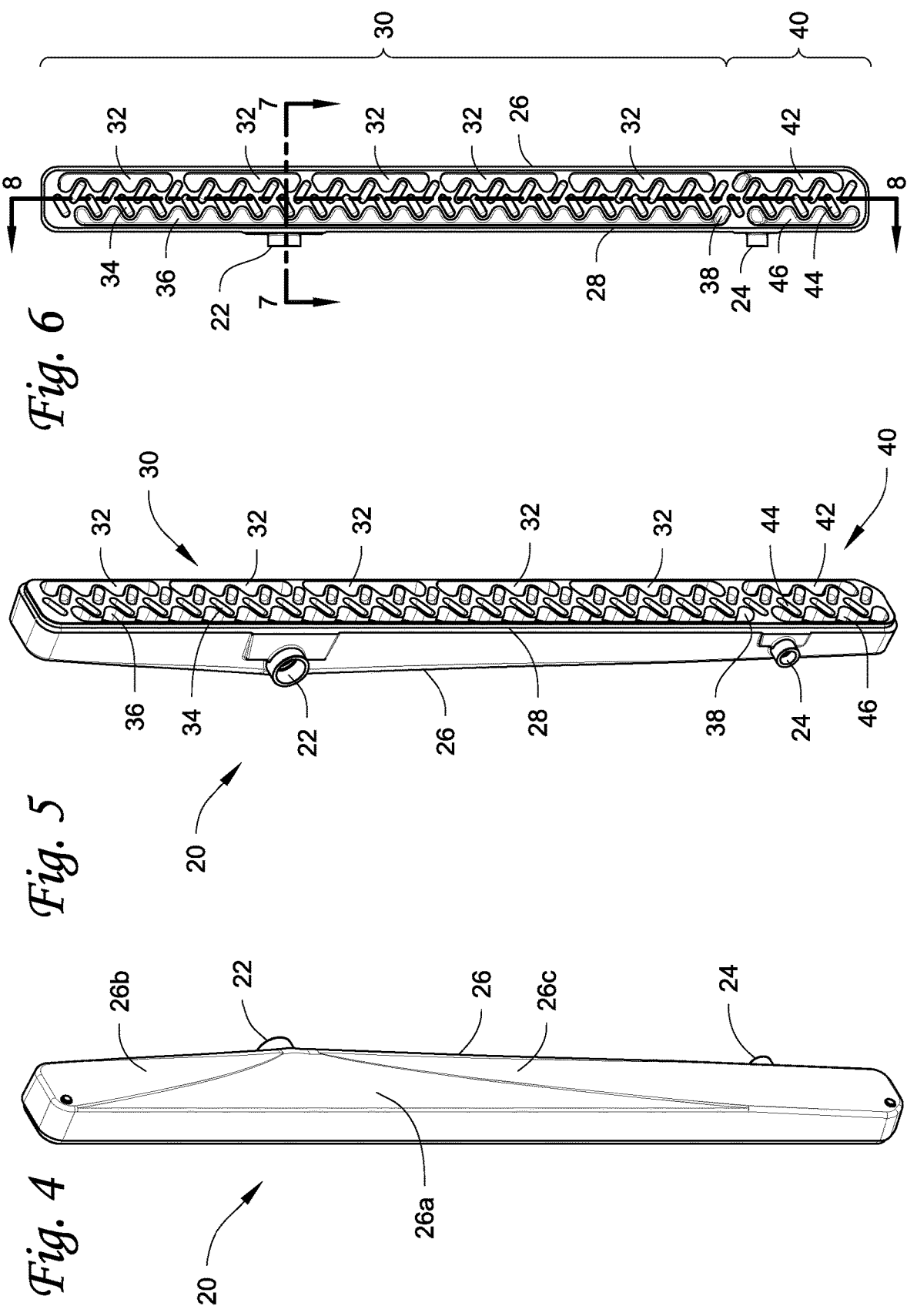

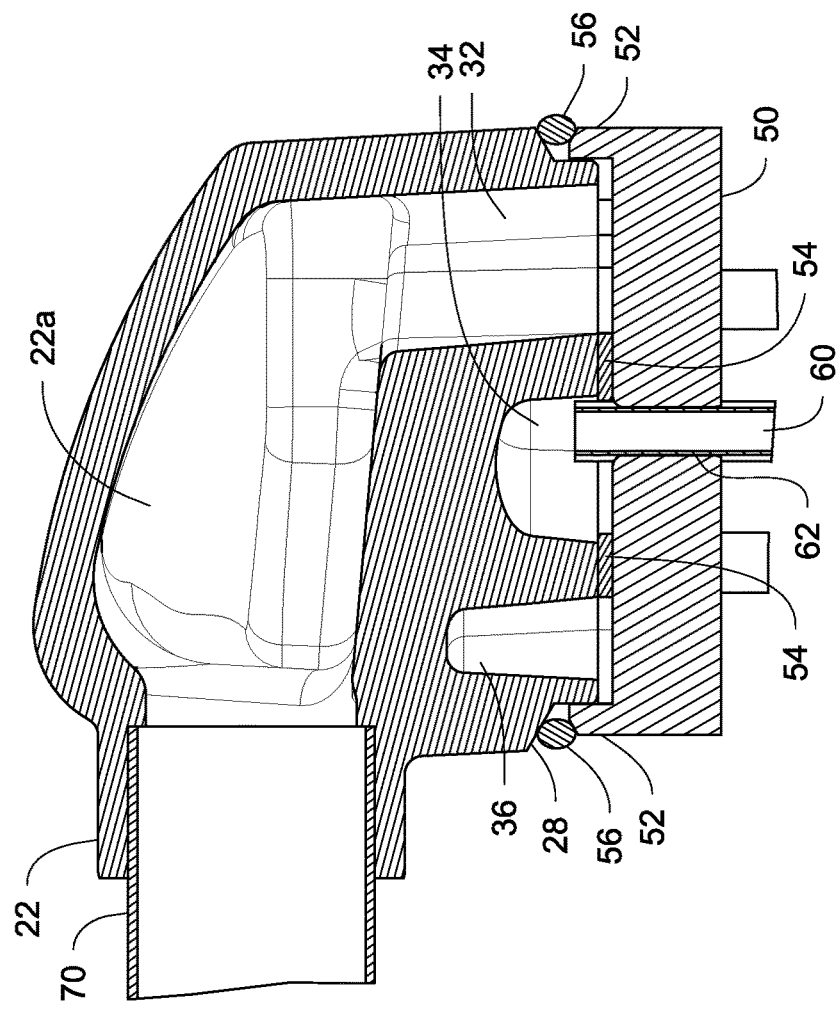

HEAT EXCHANGER WITH ALUMINUM TUBES ROLLED INTO AN ALUMINUM TUBE SUPPORT

FIELD

The disclosure herein relates to a heat exchanger, such as for example a fin and tube heat exchanger which may be used for example in a heating, ventilation, and air conditioning system (HVAC) system and/or unit thereof. The heat exchanger includes aluminum tubes mechanically rolled into an aluminum tube support, such as where a heat exchanger manifold is located and to which the tube support can be assembled.

BACKGROUND

Heat exchangers that may be used for example in HVAC systems can include various round tube designs, such as for example shell and tube heat exchangers and fin and tube (or tube and fin) heat exchangers. The round tubes can be assembled with various return bends and header components, fins, and tube supports, such as by a brazing process. In some heat exchangers, the tubes may be copper and other components, e.g. the fins, may be aluminum.

SUMMARY

A heat exchanger is described that includes aluminum tubes mechanically rolled into an aluminum tube support, which is assembled to a manifold. It will be appreciated that the heat exchanger may include any one or more of the following features. In some embodiments, the tube support is constructed as a tube sheet.

In some embodiments, the heat exchanger is a tube and fin heat exchanger, used for example in a HVAC system and/or one or more units thereof. In some embodiments, the tube and fin heat exchanger is any of a condenser coil, evaporator coil, and/or heat pump, and whether the heat exchanger may be configured for heating and/or cooling may be dependent upon the mode of operation of the heat exchanger. In some embodiments, the HVAC system or unit includes a fluid chiller, such as for example a water chiller, in which the heat exchanger described herein can be incorporated. In some embodiments, the heat exchanger is an air-cooled condenser tube and fin coil, such as may be used in a water chiller of an HVAC system.

In one embodiment, the heat exchanger includes tubes having end portions inserted into openings of a tube support. The tubes are aluminum and the tube support is aluminum, where the end portions of the tubes are mechanically rolled and expanded within the openings of the tube support. The tubes are mechanically connected through the process of being mechanically rolled and expanded into the tube support. The tube support is assembled to a manifold with components configured to allow fluid circulation through the heat exchanger and into and/or out of the heat exchanger.

In one embodiment, the end portions of the aluminum tubes, which are mechanically rolled and expanded within the openings of the tube support, have an interference fit within the openings of the tube support so as to create a mechanical connection therebetween. The mechanical connection, e.g. interference fit, is suitable to meet design pressures at which the heat exchanger may be used.

In one embodiment, leakage is prevented or at least minimized between the aluminum tubes and the tube support, as a sealant is applied between the end portions tubes and the openings of the tube support.

In one embodiment, the aluminum tube support is assembled to a manifold such as by a welded joint and sealed portion(s). The welded joint is disposed on outer connection areas of aluminum tube support and manifold. The sealed portion is disposed between faces of the aluminum tube support and manifold that are in fluid cooperation.

In one embodiment, any one or more of the sealant and the sealed portion can include a wicking grade adhesive, which may cure anaerobically. In one embodiment, the sealed portion may be a compliant material that can form a crushed gasket resulting for example from shrinkage at the welded joint.

In one embodiment, the welded joint includes a stress relief portion. In one embodiment, the stress relief portion is disposed on the aluminum tube support. In one embodiment, the stress relief portion includes a deformable flange, which may be disposed for example on an outer portion of the aluminum tube support.

In one embodiment, the manifold is a casted component that includes a gas header, an intermediate header, a liquid header, and fluid flow bends in a single manifold component.

In one embodiment, the manifold is a brazed assembly with suitable return bends, headers, header stubs, the assembled components of which are configured for fluid circulation including through the heat exchanger and into and/or out of the heat exchanger. Brazing can be limited to assembly of the manifold while avoiding brazing at the ends of the tubes and the tube support.

In one embodiment, the other end portions of the tubes are inserted into openings of another tube support. The end portions of the tubes are aluminum and the tube support is aluminum, where the end portions of the tubes are mechanically rolled and expanded within the openings of the tube support. The tube support is assembled to a manifold with components configured to allow fluid circulation through the heat exchanger and into and/or out of the heat exchanger. The heat exchanger in this configuration has aluminum tubes rolled into a tube support at both longitudinal ends.

In one embodiment, the heat exchanger can be configured to allow for step circuiting of multiple heat exchangers, where aluminum tubes are mechanically rolled and expanded within the openings of one or more tube supports. Manifolds of step circuited heat exchangers include components suitably configured to allow fluid circulation, such as for example an appropriate amount of passes, bends, headers, and header stubs, through the heat exchangers and into and/or out of the heat exchangers. The use of step circuiting configurations can be useful for designs, for example where it may be desired and/or intended to keep a flow velocity within a certain range. A heat exchanger can be configured so that the gas portion of the coil has relatively more circuits and where the number of circuits can decrease as the refrigerant condenses (lower volume) in condenser, or can increase as the refrigerant evaporates (higher volume) in an evaporator. Where a liquid subcooler is used in such step circuiting configurations, the subcooler can have relatively fewer or the fewest circuits.

In one embodiment a method of assembling a heat exchanger includes mechanically rolling and expanding aluminum tubes into openings of a tube support to thereby create an interference fit between the aluminum tubes and the tube support. The aluminum tubes and tube support are sealed together to limit leakage therebetween. The tube sheet is assembled to a manifold and sealed therewith.

The heat exchanger configurations described herein can provide aluminum tubes mechanically rolled and expanded in a tube sheet, which can eliminate brazing or at least substantially reduce brazing with aluminum. The heat exchangers herein can be oil tolerant as compared to brazing, such as when the tubes are expanded into fins in the presence of oil or lubricant, where the lubricant may not need to be removed in order to mechanically roll and expand the tubes into the tube sheet. The mechanically rolled and expanded tubes can provide a more reliable assembly with consistent joints that can be relatively less susceptible to corrosion as compared for example to some copper tube/ aluminum fin brazed assembly designs.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIG. 4 is a perspective view of one embodiment of a casted manifold which may be used in a heat exchanger described herein, such as shown in FIG. 1.

FIG. 5 is another perspective view of the casted manifold which may be used in a heat exchanger described herein, such as shown in FIG. 1.

FIG. 6 is an inside view of the casted manifold which may be used in a heat exchanger described herein, such as shown in FIG. 1.

FIG. 7 is a sectional view taken from line 7-7 in FIG. 6 showing the casted manifold of FIG. 4 when assembled to a tube support with tubes mechanically rolled and sealed into the tube support.

FIG. 8 is another sectional view of the casted manifold which may be used in a heat exchanger described herein, such as shown in FIG. 1.

DETAILED DESCRIPTION

Figure 1:
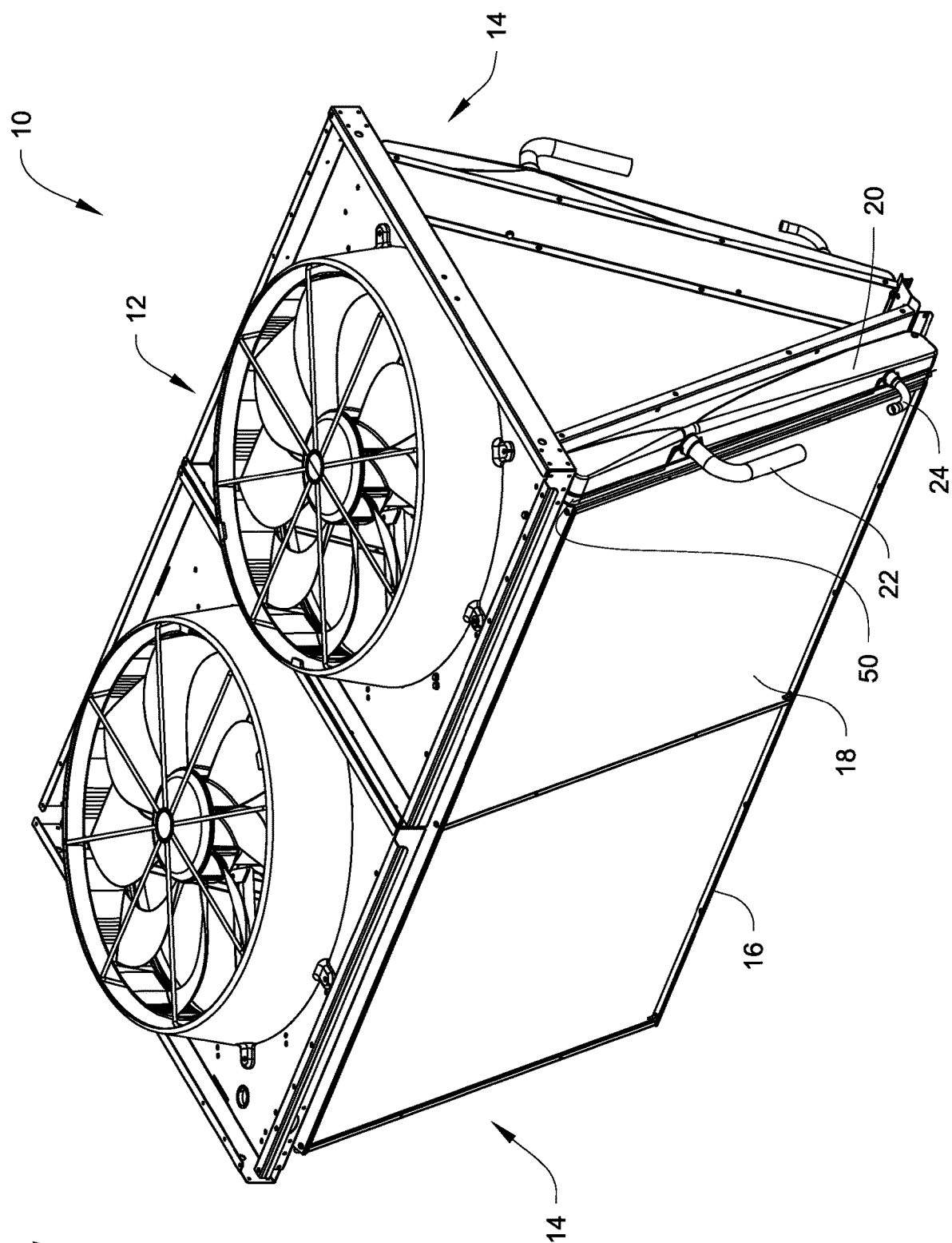
FIG. 1 is a perspective view one embodiment of a heat exchanger which may be included in a condenser coil and fan assembly of a HVAC system or unit.

A heat exchanger is described that includes aluminum tubes mechanically rolled into and expanded into an aluminum tube support, such as for example a tube sheet, and fluidically sealed with the tube support. The tube support is assembled to a fluid manifold that allows fluid flow, such as for example of a heat transfer fluid, including but not limited to refrigerant, water, and where such heat transfer fluid can be in various phases of liquid and/or vapor, and mixtures thereof.

In the area of heat exchange coils, e.g. condenser and/or evaporator coils, for example, there may be issues connecting return bends and headers to aluminum tubed coils. Brazing or soldering can be used, but brazing may need precise temperature control, due to the narrow temperature difference(s) between the melting points of the braze material and of the aluminum. Because of such narrow temperature difference(s), brazing can be done using a controlled atmosphere brazing (CAB) process. CAB may not be suitable to conventional round tube plate fin coils, where the tubes are expanded into the fins, because annealing of the fins can result in less than desirable fin strength and sometimes unacceptable fin strength. Flame brazing may also be used, which involves using either automated or manual torches. However, soldering involves corrosive flux or ultrasonic vibration to remove surface oxide of the aluminum. Corrosive flux can be difficult to remove. Ultrasonic soldering can be done with a tank of molten solder. Return bends and headers are connected to the coil and the resulting assembly is dipped into the molten solder. Both CAB and ultrasonic soldering processes can be difficult and expensive for coils larger than a few feet in any dimension. Prior to brazing, the braze surfaces are often cleaned for example to remove oils, such as for example by using thermally degreasable lubricants and degreasing ovens. In some cases where the tubes are expanded into a fin pack(s), such as for example aluminum fins, oil or lubricant is used to expand the tubes into the fins, where such oil or lubricant may be difficult to remove.

Constructing large air-cooled condenser coils, such as may be used in products, including for example a water chiller in HVAC systems and/or units, may consider such factors as above. One solution is a heat exchanger described herein that eliminates the need for soldering or brazing of the coil assembly or significantly reducing the need for brazing at portions of the assembly where it may not be desired and/or suitable. In addition, the heat exchanger herein can eliminate thermal degreasing requirements.

Generally, heat exchangers and methods of assembly are described which include aluminum tubes rolled into a tube support, for example a tube sheet, which is then assembled to a fluid manifold. In some cases, the fluid manifold is a casted component welded to the tube sheet. This construction and assembly can significantly reduce the part count of the coil as the casted manifold consolidates return bends, headers, and header stubs. In comparison to conventional round copper tube plate fin coils, manual placement of return bends and manual flame brazing can be eliminated.

Figure 2:
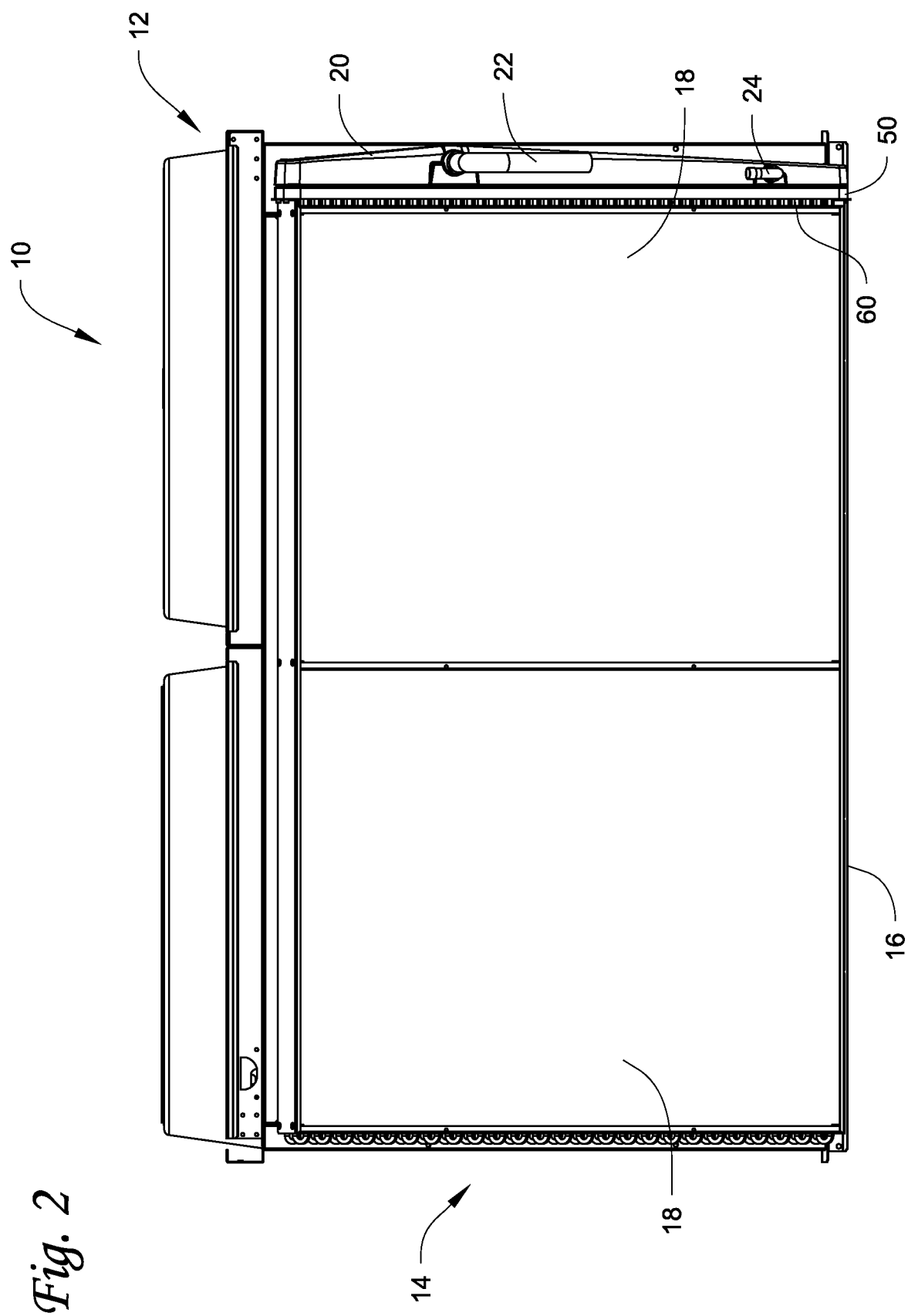
FIG. 2 is a side view of the heat exchanger in the condenser coil and fan assembly shown in FIG. 1.
Figure 3:
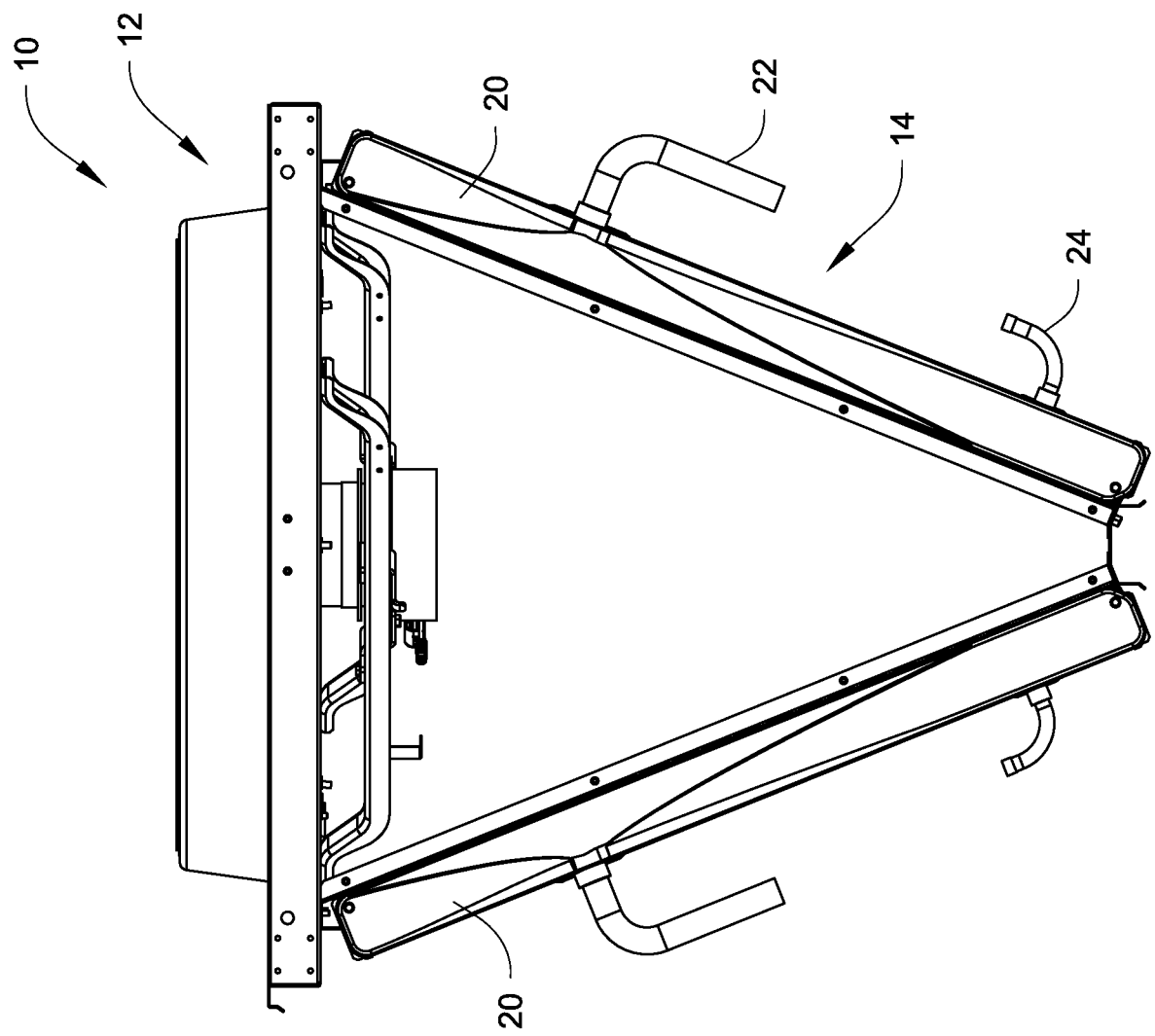
FIG. 3 is an end view of the heat exchanger in the condenser coil and fan assembly shown in FIG. 1.

FIGS. 1-3 illustrate views of one embodiment of a heat exchanger 14, which may be in the form of one or more condenser coil(s) assembled with a fan assembly. The condenser coil and fan assembly 10 can be used in a HVAC system or unit. In some embodiments, such as described herein, the heat exchanger 14 is a tube and fin heat exchanger, used for example in a HVAC system and/or unit thereof.

It will be appreciated however that, in some embodiments, the tube and fin heat exchanger is any of a condenser coil, evaporator coil, and or heat pump, and how the heat exchanger is used may be dependent upon the mode of operation of the heat exchanger. In some embodiments, the HVAC system or unit includes a fluid chiller, such as for example a water chiller, in which the heat exchanger described herein is incorporated. In some embodiments, the heat exchanger is used in an air-cooled condenser tube and fin coil, and may be used for example in a water chiller of an HVAC system.

In the embodiment shown in FIGS. 1 to 3, two heat exchangers 14 (or condenser coils) can be arranged as a V-shape, with the fan assembly 12 assembled on top of the heat exchangers 14. It will be appreciated that the specific configuration of the coil and fan assembly 10 is not limiting, and can have configurations other than a V shape, such as for example a W shape, or other suitable arrangements/configurations that may employ multiple heat exchangers. It will also be appreciated that a single heat exchanger may be employed per condenser coil and fan assembly.

As shown, the heat exchanger 14 includes an assembly of tubes and fins 18 (18 represents area where fins, fin pack(s) are assembled with tubes 60), which are supported by a frame 16 (see e.g. FIG. 2 for the tubes, fins not shown for ease of illustration). In a round tube and fin heat exchanger, such as for example the condenser coil shown in FIGS. 1 to 3, the tubes are expanded into fins using known processes. It will be appreciated that the fins are known and need not be further described. A fluid manifold 20 is disposed at an end of the heat exchanger 14, and in some embodiments, such as shown in FIGS. 1 to 3, the fluid manifold 20 includes an inlet 22 and an outlet 24. The inlet 22, which can be connected to a fluid line as shown, is configured for example to allow entry of heat exchange fluid, e.g. refrigerant gas, into the heat exchanger 14. The outlet 24, which can be connected to a fluid line as shown, is configured for example to allow exit of heat exchange fluid, e.g. refrigerant liquid, out of the heat exchanger 14. It will be appreciated that the specific location of the inlet 22 and outlet 24 is not meant to be limiting. For example, the inlet 22 and outlet 24 can be on the same end of the heat exchanger 14 as shown or in different locations on the same end. It will also be appreciated that the inlet 22 and outlet 24 may be on different ends, for example depending on the number of passes (e.g. even or odd) the heat exchanger, e.g. heat exchanger 14, has to direct the flow of heat exchange fluid through the heat exchanger.

FIGS. 4 to 6 and FIG. 8 show details of the fluid manifold 20. The fluid manifold 20 in some embodiments is a casted component that includes a gas header, an intermediate header, a liquid header, and fluid flow bends in a single fluid manifold component. The fluid manifold 20 as shown in FIGS. 1 to 3 for example can connect the ends of the heat exchange tube at an end of the heat exchanger 14. FIG. 7 described below further illustrates assembly of the fluid manifold 20 with the fin and tube and tube support.

FIG. 4 shows an outer 26 of the fluid manifold 20. The fluid manifold 20 has the inlet 22 and outlet 24 connections. The outer 26 in some embodiments can have surfaces 26a, 26b, and 26c that slope, for example up toward the area where the inlet 22 is located. As shown, the surfaces 26a, 26b, and 26c converge toward the inlet similarly like a peak. Likewise, the surfaces 26a, 26b, and 26c slope downward away from the inlet such as in three directions including toward the top and bottom and toward the side opposite the side the inlet 22 is located. The surfaces 26a, 26b, and 26c can be configured to allow optimized flow of the heat transfer fluid into fluid manifold 20 and to other portions of the heat exchanger, e.g. heat exchanger 14.

FIGS. 5 and 6 show inside views of the fluid manifold 20. In one embodiment, the fluid manifold 20 includes a gas header, an intermediate header, a liquid header, and fluid flow bends in a single manifold component. The fluid manifold 20 can achieve this through for example a de-superheat and condensing section 30 which has a network of chambers and channels to allow for heat exchange fluid to enter as vapor and/or gas, e.g. into the gas header 32, flow through the fluid return bends 34 to the intermediate header 36, flow to and/or collect in the liquid header 42, flow through the fluid return bends 44, flow to and/or collect in the outlet header 46, and then exit at the outlet 24. In some embodiments, the fluid manifold 20 has the liquid header 42, return bends 44, and outlet header 46 which can be employed as a subcooler section 40, which is fluidly connected to the condensing section 30 such as for example by a connecting tube 38. The subcooler section 40, in some embodiments such as shown, has a network of chambers and channels to allow for heat exchange fluid from the intermediate header 36 to flow into entry chamber or liquid header 42, flow through fluid return bends 44, and collect in the exit chamber or outlet header 46, which is fluidically in communication with the outlet 24.

In the embodiment shown, the configuration of the condensing section 30 and the subcooler section 40 is specific to a certain heat exchanger size and number of passes, e.g. circuits, e.g. heat exchanger 14. For example, the gas header 32 can be a number of scalloped chambers, such as for example the five chambers 32 as shown. The intermediate header 36 can be a single collection chamber in a similar scalloped arrangement (e.g. relatively larger and smaller flow areas), and that extends the height of the condensing section 30. The relatively larger and smaller flow areas of the gas header chambers 32 can be arranged out of phase with similar areas of the intermediate header 36. The fluid return bends 34 can be slanted downward toward the relatively smaller areas of the gas header 32 and the intermediate header 36. Likewise, the fluid return bends 34 have an alternating arrangement from the top toward the bottom of the fluid manifold 20. In the embodiment shown, the condensing section is able to accommodate twenty one circuits of heat exchanger tubes, each circuit having six passes through respective portions of the gas header 32, fluid return bends 34, and intermediate header 36 before entering the subcooler section 40. It will be appreciated that the specific configuration of the heat exchanger including for example the number of circuits and their respective passes can vary depending on the desired size, configuration, and construction of the heat exchanger.

FIGS. 5 and 6 also show an interface 28, which may be a shoulder, ledge, bevel, or other suitable structure, which can provide a mating surface for the welded joint to the tube support, and which is described further below with respect to FIG. 7.

FIG. 8 shows another sectional view of the fluid manifold 20 where like references are shown. FIG. 8 shows the contoured outer 26, where the sloping surfaces e.g. 26b, 26c can provide an optimized sizing of an internal chamber 22a that is patterned to follow the flow of heat exchange fluid from the inlet 22, e.g. refrigerant vapor, into the fluid manifold 20. The internal chamber 22a is in fluid communication with the gas header 32.

It will be appreciated that the specific configuration of the chambers and channels of the fluid manifold 20 are not meant to be limiting, and that FIGS. 4 to 6 show one example of a casted fluid manifold with some structures that may be used in a heat exchanger, e.g. heat exchanger 14. For example, the specific arrangement and construction of the condensing section 30, with its gas header 32, intermediate header and fluid return bends 34, and liquid header, and of the subcooler section 40, with its entry chamber or liquid header 42, fluid return bends 44, and exit chamber or outlet header 46, can be modified, changed, re-configured, or otherwise constructed differently to achieve a fluid flow through the manifold as may be desired and/or suitable depending on the heat exchanger employed.

FIG. 7 partially shows a heat exchanger assembly, which can be for example the heat exchanger 14, including tubes 60 and fins (e.g. 18 from FIGS. 1 to 3) with a tube support 50 and fluid manifold, such as for example the fluid manifold 20. FIG. 7 can be taken for example from line 7-7 on FIG. 6. FIG. 7 also shows the casted manifold, e.g. 20 of FIGS. 4 to 6 and 8, when assembled to the tube support 50 with tubes 60 mechanically rolled and sealed into the tube support 50. The fins are not shown for convenience of illustration, however, it is appreciated that the tubes 60 may be expanded into fins, e.g. aluminum fins 18, such as within the frame support 16 shown in FIGS. 1 to 3 using conventional processes that are known. Relevant elements are shown, for example of the manifold 20 from FIGS. 4 to 6 and 8, including for example, the inlet 22, the internal chamber 22a, one of the gas headers 32, one of the fluid return bends 34, and the intermediate header 36. Additionally, a header tube 70 may be connected to the inlet 22.

In one embodiment, the heat exchanger 14 includes tubes 60 having end portions inserted into openings of a tube support 50. In one preferred embodiment, the tubes 60 are aluminum and the tube support 50 is aluminum, where the end portions of the tubes 50 are mechanically rolled and expanded within the openings of the tube support 50. It will be appreciated that a mechanical roll and expansion of the tubes 60 into the tube sheet 50 can be accomplished by known approaches, such as for example by using a rotating pin or mandrel that can be inserted into the tubes 60. Expansion members, such as rollers, on the rotating pin or mandrel are extended outward as the pin or mandrel rotates thus rolling and expanding the tube 60 within the opening of the tube sheet 50.

In one embodiment, the tube support 50 is a tube sheet that is disposed toward an end of the heat exchanger, and extends the full height (or longitudinal distance) of the fluid manifold, such as fluid manifold 20, and/or extends the full height (or longitudinal distance) of the heat exchanger, such as the heat exchanger 14 shown in FIGS. 1 to 3. The tube support 50 is assembled to a fluid manifold, such as fluid manifold 20, with components configured to allow fluid circulation through the heat exchanger and into and/or out of the heat exchanger.

In one embodiment, the end portions of the aluminum tubes 60, which are mechanically rolled and expanded within the openings of the tube support 50, have an interference fit within the openings of the tube support (at 62) so as to create a mechanical connection therebetween, and so as to be suitable to meet design pressures at which the heat exchanger may be used. For example, the heat exchanger and its assembly are able to withstand pressures of at and/or about and/or at least 1750 psig, and at and/or about and/or at least 1950 psig. For example, the heat exchanger may be used with high pressure operating refrigerants such as for example R134a, R410a.

In one embodiment, leakage is prevented or at least minimized between the aluminum tubes 60 and the tube support 50, for example by using a sealant applied between the end portions tubes 60 and the openings of the tube support 50 (at 62).

In one embodiment, the aluminum tube support 50 is assembled to a manifold, e.g. fluid manifold 20, such as by a welded joint 56 and a sealed portion 54. The welded joint 56 is disposed on outer connection areas of the aluminum tube support 50 and manifold 20. The sealed portion 54 is disposed between faces of the aluminum tube support 50 and manifold 20 that are in fluid cooperation.

In one embodiment, any one or more of the sealant at 62 and the sealed portion 54 can include a wicking grade adhesive, which may cure anaerobically. It will be appreciated that an adhesive may be suitably selected with an appropriate cure time to accommodate the mechanical roll and expansion and weld processes to occur. In other embodiments a groove may be formed in the tube sheet 50 to provide for a portion of the seal at 62 and/or sealed portion 54, and which may or may not employ an adhesive.

In one embodiment, the sealed portion 54 forms a crushed gasket resulting from the welded joint 56. In one embodiment, the sealed portion 54 includes a compliant material, such as for example a relatively soft rubber, where the sealed portion 54 undergoes a crush as a result of shrinkage at the welded joint 56.

In one embodiment, the welded joint 56 includes a stress relief portion(s) 52. In one embodiment, the stress relief portion(s) 52 is disposed on the aluminum tube support 50. However, it will be appreciated that stress relief portion(s) can be similarly disposed on the manifold 20. In one embodiment, the stress relief portions 52 such as shown include a deformable flange, which may be disposed for example on an outer portion of the aluminum tube support 50. The interface 28 provides a mating surface for the welded joint 56 between the tube support 50 and the fluid manifold 20. As shown, the welded joint 56 is made up of the stress relief portions 52 and the interface 28 with the weld material (at 56) therebetween.

In other embodiments, it will be appreciated that, depending on the number of passes in a heat exchanger as well as the size of the heat exchanger, the other end can also have a similar construction and arrangement of aluminum tubes mechanically rolled and expanded into a tube sheet. For example, the other end portions of the tubes 60 are inserted into openings of another tube support, e.g. similar to 50. The end portions of the tubes 60 are aluminum and the tube support is also aluminum, where the end portions of the tubes are mechanically rolled and expanded within the openings of the tube support. The tube support is assembled to another fluid manifold with components configured to allow fluid circulation through the heat exchanger and into and/or out of the heat exchanger. It will be appreciated that the fluid manifold can be similar to fluid manifold 20, but suitably modified to achieve the desired and/or appropriate flow through the heat exchanger. For example, this second manifold at the other end can have the outlet, e.g. 24, since the second manifold could act as a return header, whereas the first manifold, e.g. 20 shown in FIGS. 1-3, may not have the outlet 24. The heat exchanger in such a configuration can then have aluminum tubes rolled into a tube support at both longitudinal ends.

Figure 14:
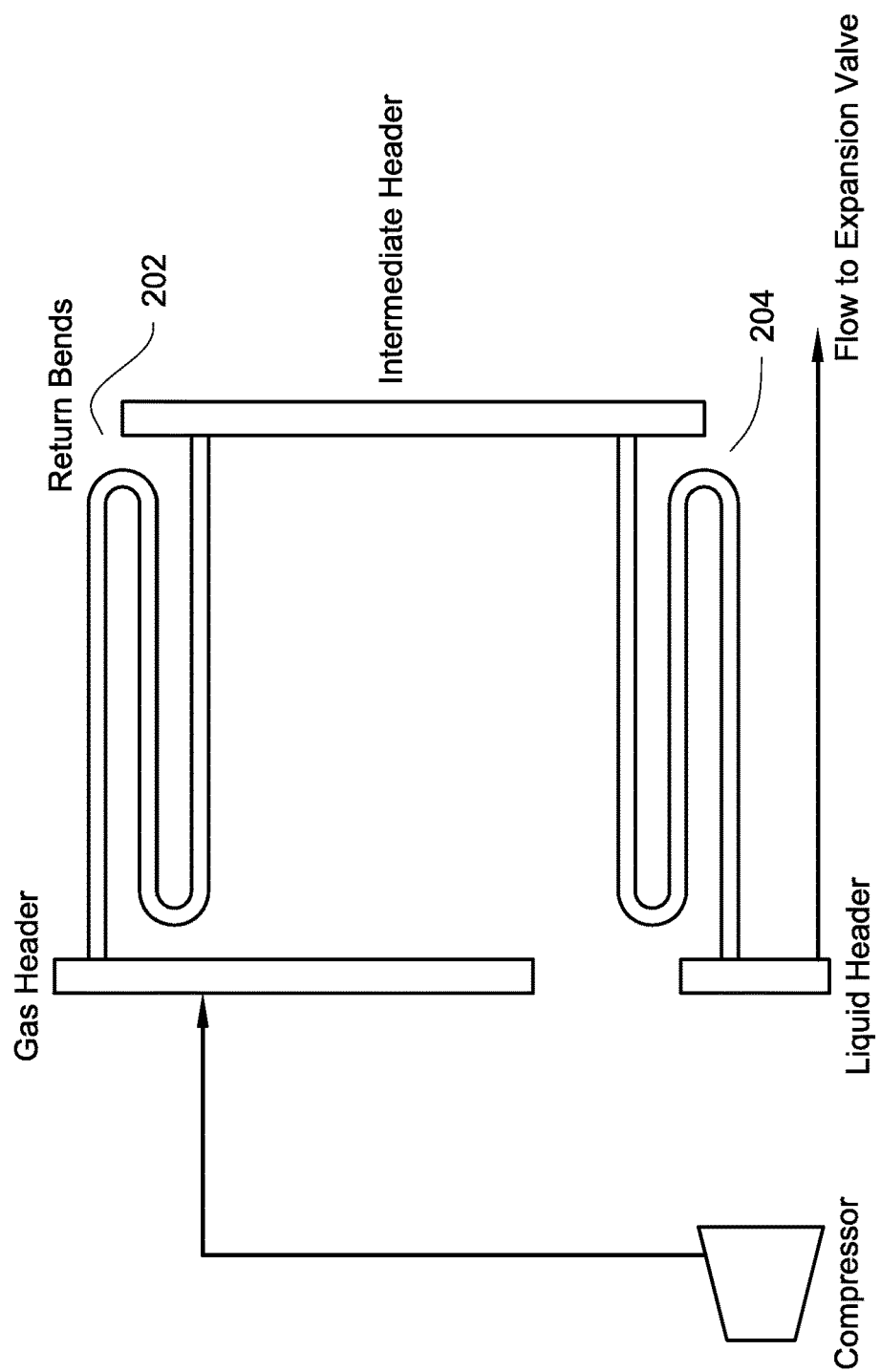
FIG. 14 is a schematic partial architecture view of a heat exchanger that includes step circuiting in the fluid flow, in which the assembly embodiments herein may be incorporated.

In other embodiments, it will be appreciated that, depending on the number of passes in a heat exchanger as well as the size of the heat exchanger, the heat exchanger can be configured to allow for step circuiting of multiple heat exchangers, where aluminum tubes are mechanically rolled and expanded within the openings of one or more tube supports. Manifolds of step circuited heat exchangers include components suitably configured to allow fluid circulation, such as for example an appropriate amount of passes, bends, headers, and header stubs, through the heat exchangers and into and/or out of the heat exchangers. It will be appreciated that step circuiting is designed to adjust the number of circuits to the refrigerant state. For example, the gas portion of the heat exchanger can have more circuits, whereas the intermediate portion of the heat exchanger allowing two phase (liquid/gas flow) has relatively less circuits, and the liquid portion has the least number of circuits (e.g. subcooler section). FIG. 14 shows a schematic architecture of step circuiting which is further described below.

Per the above, for example, in one embodiment a method of assembling a heat exchanger includes mechanically rolling and expanding aluminum tubes into openings of a tube support to thereby create an interference fit between the aluminum tubes and the tube support. The aluminum tubes and tube support are sealed together to limit leakage therebetween. The tube sheet is assembled to a manifold and sealed therewith.

Figure 11:
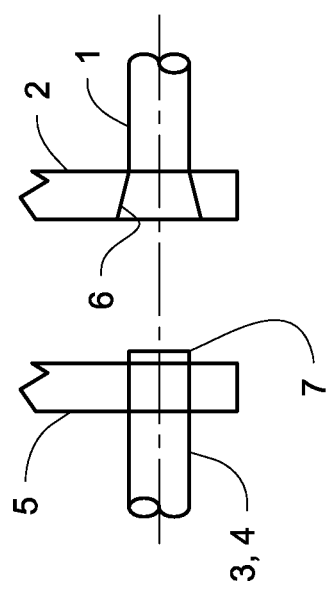
FIG. 11 is a partial schematic side view of the heat exchanger of FIG. 9 showing details of the brazed joint.
Figure 10:
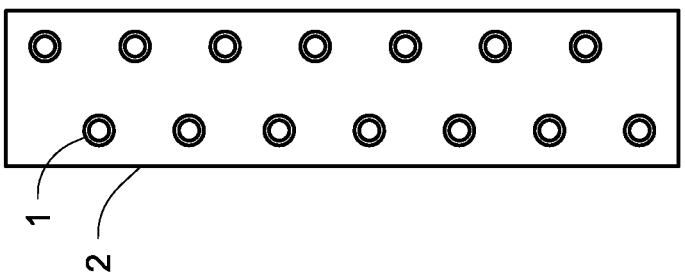
FIG. 10 is a schematic top view of the heat exchanger of FIG. 9.
Figure 9:
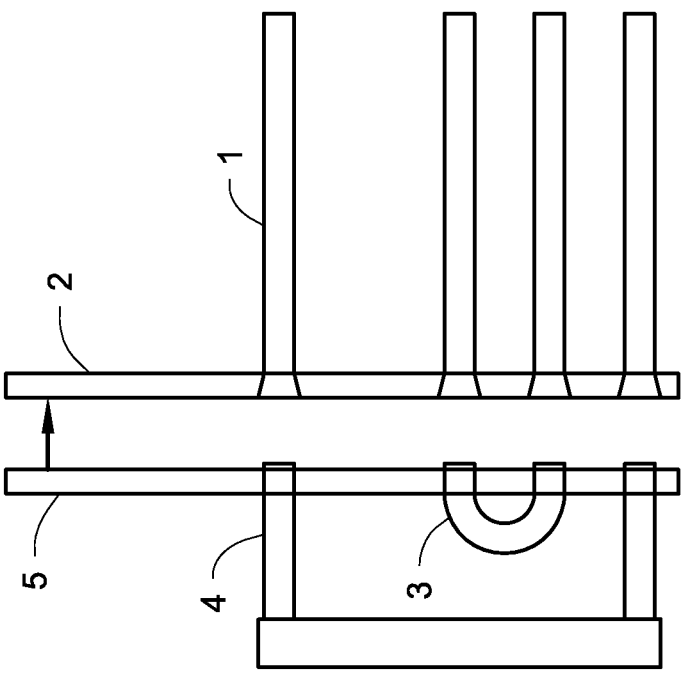
FIG. 9 is a schematic side view of another embodiment of a heat exchanger with a brazed manifold.

FIGS. 9 to 11 show schematic views of another embodiment of a heat exchanger but with a brazed manifold. Similar to above, aluminum tubes can be mechanically rolled and expanded into an aluminum tube sheet. In one embodiment, the fluid manifold is a brazed assembly with suitable return bends, headers, header stubs, the assembled components of which are configured for fluid circulation including through the heat exchanger and into and/or out of the heat exchanger. In such a configuration, brazing can be limited to assembly of the manifold while avoiding brazing at the ends of the tubes and the tube support.

In FIGS. 9 to 11, a heat exchanger and methods of assembly are described which include aluminum tubes 1 rolled into a tube sheet 2. A manufactured manifold 5 is then welded to the tube sheet 2, see e.g. arrow of FIG. 9. This concept can also reduce the part count of the coil as it consolidates return bends 3, headers and header stubs 4 into one assembly. In comparison to conventional round copper tube plate fin coils, manual placement of return bends and manual flame brazing can be eliminated.

One embodiment of the manifold 5 shown in FIGS. 9 and 10, various return bends 3 and headers 4 can be connected to a flat plate (at 5). This assembly could be assembled by CAB or ultrasonic soldered. It will be appreciated that the relatively thick plates shown for the tube sheet 2 and manifold base 5 may be made of thinner material with pierced and drawn holes.

Alternatively, such as with the fluid manifold 20 above, the manifold could be cast from aluminum or engineered glass-filled polymers. FIGS. 9 to 10 show aluminum tubes 1 mechanically rolled and expanded into a tube sheet 2 and assembled with a brazed manifold 5.

In FIG. 11, the manifold 5 can be welded to the tube sheet 2 or could be clamped to the tube sheet 2 using a bolted and gasket joint. In some embodiments, the supply and return connections 3, 4 could be made of copper, allowing easy brazing to the system.

For the mechanical roll and expansion in any of the above FIGS. 1-10, the process of rolling aluminum tube into an aluminum sheet can include some process development and joint design. For example, the wall thickness of the aluminum tubes can be considered when rolling into a tube sheet. One or more grooves may be employed on the outer diameter of the tube and/or on the inner diameter the tube sheet to enhance or otherwise help with sealing. It will be appreciated that the aluminum used for the tubes and/or the tube sheet and/or certain manifold components, may be a long life aluminum alloy, which are known and available, for example in the aluminum industry.

FIG. 11 shows joint detail of the tube 1, tube sheet 2, and manifold 5. The tube to tube sheet joint may be sealed with an adhesive or sealant such as for example, a wicking grade, anaerobic curing sealant, e.g. a suitable Loctite® product. It will be appreciated that adhesives and sealants other than Loctite® products may be suitable and/or desired. As described above, an interference fit between the inner diameter of the rolled end 6 of the tube 1 and the tube sheet 2 may be employed to insure structural integrity and mechanical connection. This would be achieved by allowing the return bend 3 and/or header stub 4 or portions thereof to protrude 7 a certain amount from the mating surface of the manifold 5. If an interference fit is used, for example, a gasket and/or sealant may be employed at the joint between 6 and 7. It will be appreciated that this approach could also be designed into the manifold if a casting or molding is used.

Figure 12:
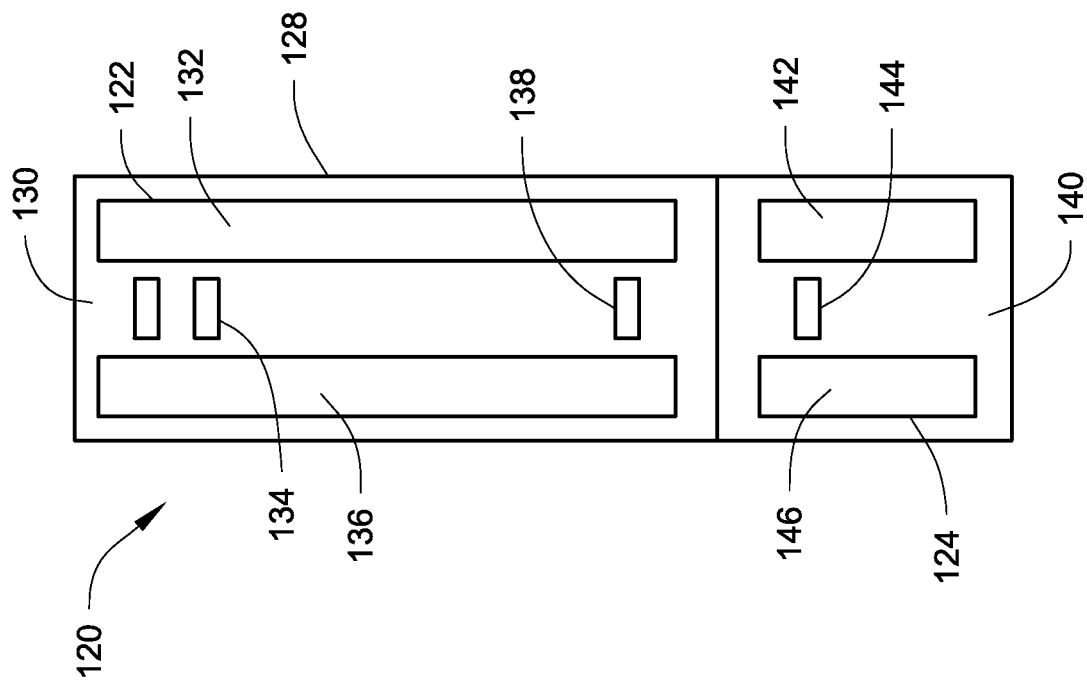
FIG. 12 is a schematic plan sectional view of an embodiment of a casted manifold.

FIG. 12 is a schematic plan sectional view of an embodiment of a casted manifold 120. As described above, it will be appreciated that the specific configuration of the chambers and channels of a fluid manifold are not meant to be limiting. For example, the specific arrangement and construction of the condensing section, with its gas header, intermediate header and fluid return bends, and liquid header, and of the subcooler section, can be modified, changed, re-configured, or otherwise constructed differently to achieve a fluid flow through the manifold as may be desired and/or suitable depending on the heat exchanger employed.

FIG. 12 shows a general plan sectional view of an embodiment of a fluid manifold 120 on the inside of the fluid manifold 120. The fluid manifold 120 in some embodiments is a casted component that includes a gas header, an intermediate header, a liquid header, and fluid flow bends in a single fluid manifold component.

The fluid manifold 120 can achieve this through for example a de-superheat and condensing section 130 which has a network of chambers and channels to allow for heat exchange fluid to enter as vapor and/or gas, e.g. into the gas header 132, flow through the fluid return bends 134 to the intermediate header 136, flow to and/or collect in the liquid header 142, flow through the fluid return bends 144, flow to and/or collect in the outlet header 146, and then exit at the outlet 124. In some embodiments, the fluid manifold 120 has the liquid header 142, return bends 144, and outlet header 146 which can be employed as a subcooler section 140, which is fluidly connected to the condensing section 130 such as for example by a connecting tube 138, which can be incorporated for example about where return bends 134 are located and about where the condensing section 130 and subcooler section 140 meet. The subcooler section 140, in some embodiments such as shown, has a network of chambers and channels to allow for heat exchange fluid from the intermediate header 136 to flow into entry chamber or liquid header 142, flow through fluid return bends 134, and collect in the exit chamber or outlet header 146, which is fluidically in communication with the outlet 124.

The fluid manifold 120 for example can connect the ends of the heat exchange tube at an end of a heat exchanger, e.g. heat exchanger 14, through a tube support. The fluid manifold 120 has inlet 122 and outlet 124 connections. The inlet 122 can be appropriately located to be fluidically in communication with the gas header 132, and the outlet 124 can be appropriately located to be fluidically in communication with the outlet header 146.

The fluid manifold 120 can also have an interface 128, which may be a shoulder, ledge, bevel, or other suitable structure, which can provide a mating surface for the welded joint to the tube support, e.g. as described above with respect to FIG. 7.

Figure 13:
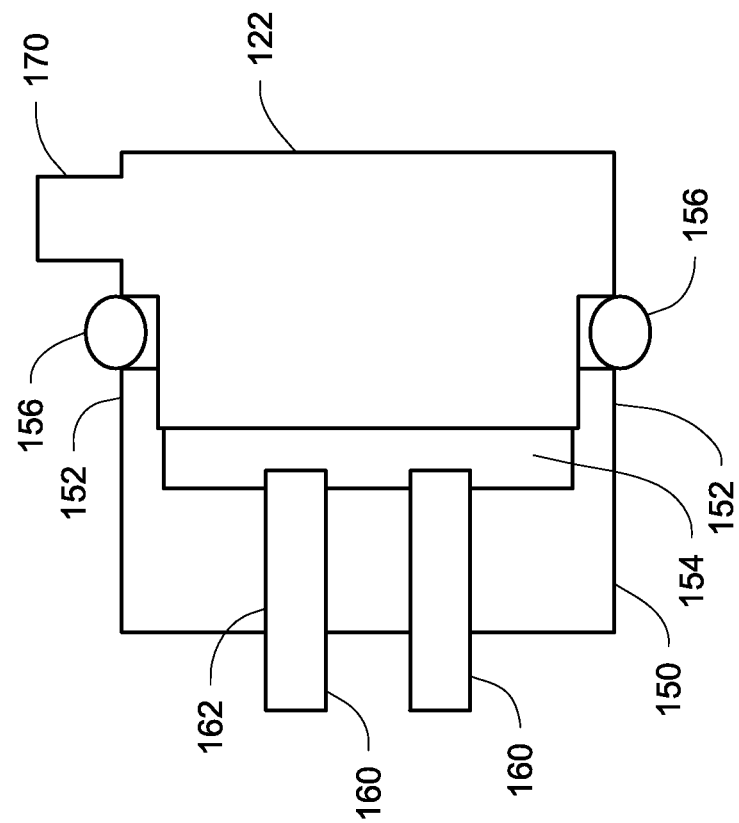
FIG. 13 is a schematic plan sectional view of an embodiment of tubes mechanically rolled and expanded into a tube support and assembled with one embodiment of a manifold.

FIG. 13 is a schematic plan sectional view of an embodiment of tubes 160 mechanically rolled and expanded into a tube support 150 and assembled with one embodiment of a manifold, e.g. 120. FIG. 13 partially shows a heat exchanger assembly including tubes 160 and fins (e.g. 18 from FIGS. 1 to 3) with a tube support 150 and fluid manifold, such as for example the fluid manifold 120 (inlet 122 is shown). The fins are not shown for convenience of illustration, however, it is appreciated that the tubes 160 may be expanded into fins, e.g. aluminum fins 18, such as within a frame support 16 shown in FIGS. 1 to 3 using conventional processes that are known. Relevant elements are shown, for example of the manifold 120, including for example, the inlet 122. Additionally, a header tube 170 may be connected to the inlet 122.

In one embodiment, the heat exchanger includes tubes 160 having end portions inserted into openings of a tube support 150. In one preferred embodiment, the tubes 160 are aluminum and the tube support 150 is aluminum, where the end portions of the tubes 150 are mechanically rolled and expanded within the openings of the tube support 150. It will be appreciated that a mechanical roll and expansion of the tubes 160 into the tube sheet 150 can be accomplished by known approaches, such as for example by using a rotating pin or mandrel that can be inserted into the tubes 160. Expansion members, such as rollers, on the rotating pin or mandrel are extended outward as the pin or mandrel rotates thus rolling and expanding the tube 160 within the opening of the tube sheet 150.

In one embodiment, the tube support 150 is a tube sheet that is disposed toward an end of the heat exchanger, and can extend the full height (or longitudinal distance) of the fluid manifold, such as fluid manifold 120, and/or extends the full height (or longitudinal distance) of the heat exchanger, such as the heat exchanger 14 shown in FIGS. 1 to 3. The tube support 150 is assembled to a fluid manifold, such as fluid manifold 120, with components configured to allow fluid circulation through the heat exchanger and into and/or out of the heat exchanger.

In one embodiment, the end portions of the aluminum tubes 160, which are mechanically rolled and expanded within the openings of the tube support 150, have an interference fit within the openings of the tube support (at 162) so as to create a mechanical connection therebetween, and so as to be suitable to meet design pressures at which the heat exchanger may be used. For example, the heat exchanger and its assembly are able to withstand pressures of at and/or about and/or at least 1750 psig, and at and/or about and/or at least 1950 psig. For example, the heat exchanger may be used with high pressure operating refrigerants such as for example R134a, R410a.

In one embodiment, leakage is prevented or at least minimized between the aluminum tubes 160 and the tube support 150, for example by using a sealant applied between the end portions tubes 160 and the openings of the tube support 150 (at 162).

In one embodiment, the aluminum tube support 150 is assembled to a manifold, e.g. fluid manifold 120, such as by a welded joint 156 and a sealed portion 154. The welded joint 156 is disposed on outer connection areas of the aluminum tube support 150 and manifold 120. The sealed portion 154 is disposed between faces of the aluminum tube support 150 and manifold 120 that are in fluid cooperation.

In one embodiment, any one or more of the sealant at 162 and the sealed portion 154 can include a wicking grade adhesive, which may cure anaerobically. It will be appreciated that an adhesive may be suitably selected with an appropriate cure time to accommodate the mechanical roll and expansion and weld processes to occur. In other embodiments a groove may be formed in the tube sheet 150 to provide for a portion of the seal at 162 and/or sealed portion 154, and which may or may not employ an adhesive.

In one embodiment, the sealed portion 154 forms a crushed gasket resulting from the welded joint 156. In one embodiment, the sealed portion 154 includes a compliant material, such as for example a relatively soft rubber, where the sealed portion 154 undergoes a crush as a result of shrinkage at the welded joint 156.

In one embodiment, the welded joint 156 includes a stress relief portion(s) 152. In one embodiment, the stress relief portion(s) 152 is disposed on the aluminum tube support 150. However, it will be appreciated that stress relief portion(s) can be similarly disposed on the manifold 120. In one embodiment, the stress relief portions 152 such as shown include a deformable flange, which may be disposed for example on an outer portion of the aluminum tube support 150. The interface 128 provides a mating surface for the welded joint 156 between the tube support 150 and the fluid manifold 120. As shown, the welded joint 156 is made up of the stress relief portions 152 and the interface 128 with the weld material (at 156) therebetween.

FIG. 14 is a schematic partial architecture view of a heat exchanger that includes step circuiting in the fluid flow, in which the assembly embodiments herein may be incorporated. In some embodiments, it will be appreciated that, depending on the number of passes in a heat exchanger as well as the size of the heat exchanger, the heat exchanger can be configured to allow for step circuiting of multiple heat exchangers, where aluminum tubes are mechanically rolled and expanded within the openings of one or more tube supports. Manifolds of step circuited heat exchangers include components suitably configured to allow fluid circulation, such as for example an appropriate amount of passes, bends, headers, and header stubs, through the heat exchangers and into and/or out of the heat exchangers. It will be appreciated that step circuiting is designed to adjust the number of circuits to the refrigerant state. For example, the gas portion of the heat exchanger can have more circuits, whereas the intermediate portion of the heat exchanger allowing two phase (liquid/gas flow) has relatively less circuits, and the liquid portion has the least number of circuits (e.g. subcooler section). In FIG. 14, a schematic architecture of step circuiting shows a gas portion 202 from the "Gas header" and a liquid section 204 at the "Liquid header". The gas portion 202 may have more circuits of tubes relative to the liquid section 204, and where an intermediate section may have a number of circuits between 202 and 204 (circuits not all shown). For example, any number of tubes from the circuits of the gas section may feed into to less tubes or one tube at the liquid section, and likewise with the intermediate section feeding from more tubes to less toward the liquid section, but were more tubes from the gas section feed into less tubes of the intermediate section.

It will also be appreciated that the gas section 202 may also have more tubes, return bends, and passes relative to the liquid section 204, and where the intermediate section (e.g. between 202 and 204) can have the appropriate number of such components relative to the gas and liquid sections 202, 204. Manifolds can also be appropriately constructed, arranged, and configured to accommodate the number of circuits, and flow components that may be desired and/or suitable for a heat exchanger assembly.

The heat exchanger configurations described herein can provide aluminum tubes mechanically rolled and expanded in a tube sheet, which can eliminate brazing with aluminum. The heat exchangers herein can be oil tolerant as compared to brazing, such as when expanding the tubes into fins which can be in the presence of oil or lubricant, where the lubricant may not need to be removed. The mechanically rolled and expanded tubes can provide a more reliable assembly with consistent joints that can be relatively less susceptible to corrosion than for example copper tube/aluminum fin designs.

Aspects

It will be appreciated that any of the aspects below may be combined with any one or more of the other aspects below.

Aspect 1. A heat exchanger includes aluminum tubes mechanically rolled into an aluminum tube support, which is assembled to a manifold.

Aspect 2. According to aspect 1, the tube support is constructed as a tube sheet.

Aspect 3. According to aspect 1 or 2, the heat exchanger is a tube and fin heat exchanger, which may be used for example in a HVAC system and/or one or more units thereof.

Aspect 4. According to aspect 3, the tube and fin heat exchanger is any of a condenser coil, evaporator coil, and/or heat pump, and whether the heat exchanger may be configured for heating and/or cooling may be dependent upon the mode of operation of the heat exchanger.

Aspect 5. According to aspect 3 or 4, the HVAC system or unit includes a fluid chiller, such as for example a water chiller, in which the heat exchanger described herein can be incorporated.

Aspect 6. According to any one of aspects 1 to 5, the heat exchanger is an air-cooled condenser tube and fin coil, such as may be used in a water chiller of an HVAC system.

Aspect 7. According to any one of aspects 1 to 6, the heat exchanger includes tubes having end portions inserted into openings of a tube support.

Aspect 8. According to any one of aspects 1 to 7, the tubes are aluminum and the tube support is aluminum, where the end portions of the tubes are mechanically rolled and expanded within the openings of the tube support.

Aspect 9. According to any one of aspects 1 to 8, the tubes are mechanically connected through the process of being mechanically rolled and expanded into the tube support.

Aspect 10. According to any one of aspects 1 to 9, the tube support is assembled to a manifold with components configured to allow fluid circulation through the heat exchanger and into and/or out of the heat exchanger.

Aspect 11. According to any one of aspects 8 to 10, the end portions of the aluminum tubes, which are mechanically rolled and expanded within the openings of the tube support, have an interference fit within the openings of the tube support so as to create a mechanical connection therebetween.

Aspect 12. According to any one of aspects 9 to 11, the mechanical connection, e.g. interference fit, is suitable to meet design pressures at which the heat exchanger may be used.

Aspect 13. According to any one of aspects 8 to 12, leakage is prevented or at least minimized between the aluminum tubes and the tube support, as a sealant is applied between the end portions tubes and the openings of the tube support.

Aspect 14. According to any one of aspects 1 to 13, the aluminum tube support is assembled to a manifold such as by a welded joint and sealed portion(s).

Aspect 15. According to aspect 14, the welded joint is disposed on outer connection areas of aluminum tube support and manifold.

Aspect 16. According to aspect 14 or 15, the sealed portion is disposed between faces of the aluminum tube support and manifold that are in fluid cooperation.

Aspect 17. According to any one of aspects 14 to 16, any one or more of the sealant and the sealed portion can include a wicking grade adhesive, which may cure anaerobically.

Aspect 18. According to any one of aspects 14 to 17, the sealed portion may be a compliant material that can form a crushed gasket resulting for example from shrinkage at the welded joint.

Aspect 19. According to any one of aspects 14 to 18, the welded joint includes a stress relief portion.

Aspect 20. According to aspect 19, the stress relief portion is disposed on the aluminum tube support.

Aspect 21. According to aspect 19 or 20, the stress relief portion includes a deformable flange.

Aspect 22. According to any one of aspects 19 to 21, the stress relief portion may be disposed for example on an outer portion of the aluminum tube support.

Aspect 23. According to any one of aspects 1 to 22, the manifold is a casted component that includes a gas header, an intermediate header, a liquid header, and fluid flow bends in a single manifold component.

Aspect 24. According to any one of aspects 1 to 23, the manifold is a brazed assembly with suitable return bends, headers, header stubs, the assembled components of which are configured for fluid circulation including through the heat exchanger and into and/or out of the heat exchanger.

Aspect 25. According to aspect 24, brazing can be limited to assembly of the manifold while avoiding brazing at the ends of the tubes and the tube support.

Aspect 26. According to any one of aspects 8 to 25, the other end portions of the tubes are inserted into openings of another tube support.

Aspect 27. According to any one of aspects 8 to 26, the other end portions of the tubes are aluminum and the tube support is aluminum.

Aspect 28. According to any one of aspects 8 to 27, the other end portions of the tubes are mechanically rolled and expanded within the openings of the tube support.

Aspect 29. According to any one of aspects 8 to 28, the tube support is assembled to a manifold with components configured to allow fluid circulation through the heat exchanger and into and/or out of the heat exchanger.

Aspect 30. According to any one of aspects 8 to 29, the heat exchanger has aluminum tubes rolled into a tube support at both longitudinal ends.

Aspect 31. According to any one of aspects 1 to 30, the heat exchanger can be configured to allow for step circuiting of multiple heat exchangers, where aluminum tubes are mechanically rolled and expanded within the openings of one or more tube supports. Manifolds of step circuited heat exchangers include components suitably configured to allow fluid circulation, such as for example an appropriate amount of passes, bends, headers, and header stubs, through the heat exchangers and into and/or out of the heat exchangers. The use of step circuiting configurations can be useful for designs, for example where it may be desired and/or intended to keep a flow velocity within a certain range. A heat exchanger can be configured so that the gas portion of the coil has relatively more circuits and where the number of circuits can decrease as the refrigerant condenses (lower volume) in condenser, or can increase as the refrigerant evaporates (higher volume) in an evaporator. Where a liquid subcooler is used in such step circuiting configurations, the subcooler can have relatively fewer or the fewest circuits.

Aspect 32. According to any one of aspects 1 to 31, a method of assembling a heat exchanger includes mechanically rolling and expanding aluminum tubes into openings of a tube support to thereby create an interference fit between the aluminum tubes and the tube support.

Aspect 33. According to any one of aspects 1 to 32, the aluminum tubes and tube support are sealed together to limit leakage therebetween.

Aspect 34. According to any one of aspects 1 to 33, the tube sheet is assembled to a manifold and sealed therewith.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A tube and fin heat exchanger for a heating, ventilation, and air conditioning (HVAC) unit, comprising:
   aluminum tubes;
   an aluminum tube support,
   the aluminum tubes include end portions inserted into openings of the aluminum tube support, the aluminum tube support is planar at a location directly surrounding the openings, and the openings extend through the location, wherein the aluminum tubes intersect the plane at the location, the end portions of the aluminum tubes are mechanically rolled and expanded within the openings of the aluminum tube support, the aluminum tubes being mechanically connected to the aluminum tube support through being mechanically rolled and expanded into the tube support, the end portions of the aluminum tubes having an interference fit within the openings of the aluminum tube support so as to create a mechanical connection therebetween, the mechanical connection being free from welds or brazing; and
   a manifold, wherein the aluminum tube support with the aluminum tubes mechanically rolled and expanded into the aluminum tube support is assembled with the manifold, wherein the manifold is a single casted manifold component that includes a gas header, an intermediate header, a liquid header, and fluid flow bends,
   wherein the fluid flow bends are each configured to receive a fluid in a first direction, redirect the fluid around a bend defined by the fluid flow bend, and provide the fluid in a second direction that is different from the first direction,
   wherein the gas header includes one or more scalloped chambers, and
   wherein the intermediate header is a single scalloped chamber.

2. The heat exchanger of claim 1, wherein the aluminum tube support is constructed as a tube sheet.

3. The heat exchanger of claim 1, wherein the heat exchanger is an air-cooled condenser tube and fin coil, which is configured for use in a fluid chiller.

4. The heat exchanger of claim 1, further comprising a sealant applied between the end portions of the aluminum tubes and the openings of the aluminum tube support.

5. The heat exchanger of claim 4, wherein the aluminum tube support is assembled to the manifold by a welded joint and one or more sealed portions.

6. The heat exchanger of claim 5, wherein the welded joint is disposed on outer connection areas of the aluminum tube support and the manifold.

7. The heat exchanger of claim 5, wherein any of the sealant and the one or more sealed portions include a wicking grade adhesive, which cures anaerobically.

8. The heat exchanger of claim 5, wherein the welded joint includes a stress relief portion.

9. The heat exchanger of claim 8, wherein the stress relief portion is disposed on the aluminum tube support.

10. The heat exchanger of claim 8, wherein the stress relief portion includes a deformable flange.

11. The heat exchanger of claim 8, wherein the stress relief portion is disposed on an outer portion of the aluminum tube support.

12. The heat exchanger of claim 1, wherein the manifold includes components configured to allow fluid circulation through the heat exchanger and into and/or out of the heat exchanger.

13. The heat exchanger of claim 1, wherein the manifold is configured for step circuiting, wherein the gas header includes a gas portion being supportive of a plurality of circuits, the intermediate header includes a portion supportive of a plurality of circuits, and the liquid header includes a portion supportive of a plurality of circuits, the plurality of circuits of the gas header being relatively greater than the portion supportive of the plurality of circuits of the intermediate header, and the portion supportive of the plurality of circuits of the intermediate header being relatively greater than the portion supportive of the plurality of circuits of the liquid header.

14. The heat exchanger of claim 1, wherein the manifold includes an inlet, the inlet is fluidly connected to the gas header, the gas header is fluidly connected to the intermediate header via a first one or more of the fluid flow bends such that in operation, a heat exchange fluid enters the inlet, is provided to the gas header, flows through the first one or more of the fluid flow bends, and is provided to the intermediate header.

15. The heat exchanger of claim 14, further comprising an outlet header, and an outlet, wherein the liquid header is fluidly connected to the intermediate header by a connecting tube, the liquid header is fluidly connected to the outlet header via a second one or more of the fluid flow bends, and the outlet header is fluidly connected to the outlet such that in operation, the heat exchange fluid is provided to the liquid header from the intermediate header via the connecting tube, the heat exchange fluid is provided from the liquid header to the outlet header via the second one or more of the fluid flow bends, and the heat exchange fluid is provided to the outlet via the outlet header.

16. The heat exchanger of claim 1, wherein the gas header includes one or more chambers, the one or more chambers including an arrangement of larger and smaller flow areas, and the intermediate header includes a chamber having an arrangement of larger and smaller flow areas, the larger and smaller flow areas of the one or more chambers of the gas header being physically arranged out of phase with the larger and smaller flow areas of the chamber of the intermediate header.

17. The heat exchanger of claim 16, wherein the fluid flow bends are slanted downward toward relatively smaller areas of the one or more chambers of the gas header.

18. The heat exchanger of claim 1, wherein the manifold includes an outer surface and an inlet, the outer surface slopes toward the inlet, a peak being formed at a location of the inlet.

19. The heat exchanger of claim 1, wherein the interference fit is able to withstand an operating pressure of 1,750 psig or greater.

20. A method of assembling a heat exchanger, comprising:

mechanically rolling end portions of aluminum tubes into openings of an aluminum tube support that is planar at a location of the aluminum tube support directly surrounding the openings and through which the openings extend, the aluminum tubes intersecting the plane at the location;

expanding the end portions of the aluminum tubes into the openings of the aluminum tube support to thereby create an interference fit between the aluminum tubes and the aluminum tube support, the interference fit being a mechanical connection free from welds or brazing;

sealing the aluminum tubes and the aluminum tube support;

assembling a manifold to the aluminum tube support, the manifold being a single casted manifold component that includes a gas header, an intermediate header, a liquid header, and fluid flow bends, wherein the fluid flow bends are each configured to receive a fluid in a first direction, redirect the fluid around a bend defined by the fluid flow bend, and provide the fluid in a second direction that is different from the first direction; and sealing the manifold to the aluminum tube support, wherein the gas header includes one or more scalloped chambers, and wherein the intermediate header is a single scalloped chamber.

* * * * *